219-121
SEARCH ROOM

Sept. 7, 1965 J. A. F. SUNNEN 3,205,338

EQUIPMENT FOR FORMING HIGH TEMPERATURE PLASMAS

Filed Sept. 25, 1962 4 Sheets-Sheet 1

INVENTOR
Albert Francois Sunnen
BY
ATTORNEYS

EQUIPMENT FOR FORMING HIGH TEMPERATURE PLASMAS

Filed Sept. 25, 1962

INVENTOR
Albert Francois Sunnen
BY
[signature]
ATTORNEYS

Sept. 7, 1965 J. A. F. SUNNEN 3,205,338

EQUIPMENT FOR FORMING HIGH TEMPERATURE PLASMAS

Filed Sept. 25, 1962 4 Sheets-Sheet 3

INVENTOR
Albert Francois Sunnen
BY
ATTORNEYS

INVENTOR
Albert Francois Sunnen
BY
ATTORNEYS

United States Patent Office 3,205,338
Patented Sept. 7, 1965

3,205,338

EQUIPMENT FOR FORMING HIGH TEMPERATURE PLASMAS

Jean Albert Francois Sunnen, Brussels, Belgium, assignor to La Soudure Electrique Autogene, S.A., Brussels, Belgium Filed Sept. 25, 1962, Ser. No. 226,098
Claims priority, application France, Oct. 6, 1961, 875,287
9 Claims. (Cl. 219—121)

The present invention relates to equipment for forming a high temperature plasma by means of an arc powered by alternating current, comprising a source of direct current, one pole of which is connected to a first electrode while the other pole is connected to a second electrode which is hollow, and means to direct the plasma formed by the arc adjoining the two electrodes above mentioned, through said hollow electrode, to come in contact with a third electrode which is connected at one side to a source of alternating current passed through the plasma and capable of sustaining an arc fed by the said alternating current.

When very high temperatures are desired in a plasma, the power developed to sustain an arc between electrodes must be considerable. In practice, the arc is most often sustained by direct current. This method of powering the arc is expensive because the cost of the necessary equipment is prohibitive, since it includes, among other things, one or several high power rectifiers or rotary generators.

To remedy this difficulty, it is sometimes preferable to power the arc by alternating current, due to the low cost of producing the requisite A.C. Unfortunately, the plasma obtained from an ordinary A.C. arc is more or less contracted in the vicinity of the electrodes between which the plasma is sustained, depending on whether the electrodes are cold or hot.

When the arc strikes between electrodes which are not provided with cooling means, it is found that they heat up considerably and even may reach a melting temperature locally, hastening their destruction. When the arc strikes between cooled electrodes, the destruction of the electrodes is slower, but the contraction of the plasma in the vicinity of the electrodes is greatly increased during the restarting after each zero value of the alternating current.

Several solutions have been proposed or applied to avoid the formation of the zone of contraction when the electrodes are cooled. For example, a pilot arc is permanently sustained between a first solid electrode and a second auxiliary solid electrode on the same side, but this pilot arc is always located on the same side of the electrode, concentrating on the electrodes with considerable heat and causing local wear on the electrodes.

The above method was proposed to replace the method which employs an auxiliary high frequency current superimposed on an alternating current at commercial frequency to power the main arc between two electrodes. In this case "high frequency" means a frequency such that at each reversal of direction of the corresponding current at that frequency, the gap between the electrodes is still ionized at the time when the voltage of the commercial frequency alternating current has recovered sufficiently to strike the arc between the electrodes of the main circuit. This condition prevails for example for a frequency of the auxiliary current of at least 1,000 cycles per second.

It is well known, however, that high frequency causes perturbing parasitic radiations, often called radio interference. Furthermore it has been observed that in the above device, restarting the arc is uncertain.

In addition to these difficulties, the spot where the arc restrikes does not remain fixed, but instead the arc wanders. This problem has been tentatively solved by suppressing the wandering action. To do so, an electromagnetic field has been created by an electromagnetic device around the electrodes, causing the arc to rotate around the axis of the electrodes, but this method, while moving the restriking spot continuously, does not eliminate the spot and consequently does not wholly eliminate the difficulty.

Attempts have been made to sustain a permanent pilot arc powered by a direct current source while striking the main arc powered by alternating current. It has been proposed in this instance to connect a first electrode, on the one hand, to a hollow coaxial electrode through a source of auxiliary direct current, and on the other hand, to a third electrode upon which the plasma created at the inlet of the hollow electrode has been projected by a gas jet, using alternating current as the main power source. While the direct current source has a current of perhaps 30 amperes, the alternating current source is capable of delivering several hundred amperes.

The present inventor has observed that, with this equipment, blow-outs of the alternating current arc were nevertheless obtained, with the same difficulties experienced which occurred with equipment powered with alternating current without any pilot arc.

The present inventor explains this result, which is surprising at first sight, by the fact that in the common portion of both circuits, that is, between the first electrode and the hollow second electrode, the alternating current of the main circuit, being much higher than the direct current of the auxiliary circuit, adds to or subtracts from this direct current in succession, during each cycle. As a result, in that portion of the arc which is common to both circuits, the current becomes zero twice during each cycle and consequently the arc is extinguished as often as if the direct current circuit were not used at all.

The object of the present invention is to produce equipment by which a permanent arc can be created by an auxiliary direct current, which permits instantaneous restriking of the alternating current arc after each zero value of the main current.

In accordance with the invention, the source of alternating current powering the main arc is connected on the one hand to the third electrode mentioned above, and, on the other hand, to an electrode other than the first electrode mentioned above.

As a result, the alternating current is not superimposed on the direct current between the two electrodes connected to the source of direct current, and therefore, the ionized plasma formed by the permanent arc created between the two electrodes connected to the direct current source and discharged at the gap where the alternating arc must strike, will be sustained permanently in this gap.

This permits restriking of the alternating current arc without any delay after the zero point of the alternating current. Thus, by delivering a strong alternating current from a source much less expensive than the direct current source, the arc can be heavily heated.

In a variation of the device of the invention, the second electrode to which an alternating current source is connected consists of the said hollow electrode. In other words, the source of direct current and the source of alternating current have a common pole connected to the said hollow electrode.

The equipment as used in the present invention may include several alternating current arcs which restrike instantaneously after each passage through zero of the alternating current powering them, provided that a permanent plasma is created between the electrodes between which the arcs are sustained.

In another variation of the equipment as per the invention, the second electrode to which the alternating current source is connected is distinct from the first three electrodes and is arranged so that the plasma which goes through the said hollow electrode may also come in contact with the end of the second electrode. Stated another way, in this variation, the alternating current circuit is closed without touching any of the electrodes of the direct current circuit.

In this variation also, the equipment may form several alternating current arcs which are restruck instantaneously after the alternating current which powers them passes through zero each time, providing that a permanent plasma is created between the electrodes from which the arcs are struck.

In the above two variations, the equipment of the invention may advantageously include several different electrodes powered by different phases of a source of polyphase alternating current, the gaps between said electrodes being kept permanently ionized by plasmas sustained by continuous arcs created as above described with relation to the plasma required for the permanency of a single alternating current arc.

The invention also relates to equipment to create a high temperature plasma, in which the plasma formed by an arc sustained between two electrodes, one of which is a hollow electrode, is projected through the hollow electrode by a jet of gas to reach beyond a second hollow electrode separated from the first hollow electrode from which it is insulated electrically by a closed chamber in which a fluid is introduced, both of these hollow electrodes being furthermore connected to a source of current capable of creating an arc between them which heats up the plasma jet in the chamber between the pair of hollow electrodes thus provided.

Equipment of this character is known in which a pilot arc is sustained between a solid electrode and a hollow electrode, the latter being connected to a source of direct current through a resistor. The resistor has a value such that the current circulating between these electrodes is much weaker, for example thirty times weaker than the current passing between the first electrode and the second hollow electrode and the second hollow electrode is connected to the same source of direct current but not through the resistor. The main arc is heated by the passage of an intense current between the solid electrode and the second hollow electrode. However, it is not possible to increase the intensity of this current at will in order to obtain a very high temperature in the arc, because the hollow electrode is in danger of melting, as the heat which is delivered to it is the sum total of that which is received by heat transfer as in any form of heat exchanger in contact with hot gases, plus that which is received from the voltage drop developed at the tip of the arc in contact with the electrode. But the heat produced in the latter manner is proportional to the current passing through the arc. Practically speaking, it is dangerous to submit a copper hollow electrode, cooled by water, to a total heat dissipation which exceeds 5 kilowatts per square centimeter.

One of the purposes of the present invention is to provide mechanism to further increase the temperature attained by the arc.

In one form of equipment of the present invention, the said pair of hollow electrodes is followed by at least one other hollow electrode, each new hollow electrode forming with the previous hollow electrode from which it is electrically insulated, a new pair of hollow electrodes between which a closed chamber is provided, the hollow electrodes of this new pair being connected to a source of electric current distinct from the previous one and capable of creating between them an arc which further heats the plasma in the said chamber, which chamber is provided with means to introduce a fluid to expel the plasma from the chamber.

With such equipment, it is sufficient to apply to the successive hollow electrodes currents which are a fraction only of the single current which might produce fusion of one hollow electrode, and thus it is possible to avoid the danger of reaching the critical limit at which melting would take place in these distinct electrodes.

This subdividing of the intensity of the total current needed to heat the arc is applicable no matter what means may be used to facilitate the striking of the arc.

In the preferred embodiment of the device of the invention, the various sources of current powering the successive pairs of electrodes are sources of alternating current dephased with respect to one another to such an extent that at the time the current in one of these sources passes by zero in one chamber, the current supplied by the previous source in the previous chamber had a value sufficient to create in the said previous chamber an arc whose expelled plasma reaching said one chamber permits instantaneous restriking of the arc in said one chamber after the current therein has dropped to zero.

Other particulars and details of the invention are shown by description of the drawings attached to this specification, which drawings illustrate schematically and only by way of example several embodiments of the equipment of the invention.

In these various figures, like reference notations pertain to identical elements.

Figure 1:
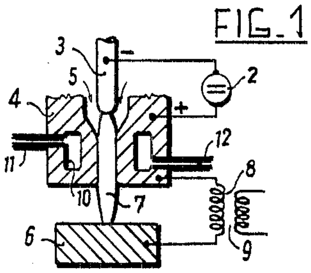
FIGURE 1 shows in diagrammatic axial section a sketch of the equipment of the invention, showing the use of a source of direct current to create a permanent plasma between two electrodes connected to the power circuit of a single phase alternating current arc.

The equipment shown in FIGURE 1 includes a source of direct current 2, having one pole connected to a first electrode 3 which is solid, while the other pole is connected to a second electrode 4 which is hollow. In the actual embodiment the negative pole is connected to the solid electrode and the positive pole is connected to the hollow electrode and this arrangement is preferable but not essential to the invention.

While electrode 3 is said to be solid, it can if desired have a core containing for example metallic or nonmetallic powders, etc.

The source 2 is capable of sustaining a permanent arc between the electrodes 3 and 4. Ionized plasma formed by contact with this arc is projected by a jet of gas indicated by arrows 5, through the hollow electrode 4 to contact a third electrode 6. The permanent plasma is designated 7. The third electrode 6 is connected to one side of a source of alternating current consisting for example of the secondary winding 8 of a transformer 9 whose primary winding is powered from an alternating current source not separately shown. The secondary winding 8 is connected at the other side to the hollow electrode 4. It will be noted that, as mentioned in the claims, this connection to electrode 4 is to an electrode which is distinct from the first electrode 3. The presence of a permanent plasma between electrodes 4 and 6 of the alternating current circuit insures instantaneous restriking of the arc after each time when the alternating current wave passes through zero. The alternating current arc thus obtained may be used, for example, to cut the work piece 6 which acts as the third electrode, or it may deposit a welding bead or deposit of metallic or nonmetallic material upon said work piece 6.

The hollow electrode 4 is cooled in any well known manner as by a coolant fluid in liquid form which circulates through chamber 10 of electrode 4. This fluid enters the chamber by an inlet 11 and leaves by an outlet 12.

When the alternating current energizes the arc between the electrodes 4 and 6, the plasma 7 heats up and its volume increases. As a consequence, it is possible to spread these two electrodes farther apart without losing simultaneous contact of the plasma with both electrodes. Such increase in the distance between the electrodes 4 and 6 is advantageous to apply greater power between them through a rise in voltage without increasing the current intensity, and therefore without increasing the $RI^2$ losses in said electrodes and in their electrical leads.

Figure 2:
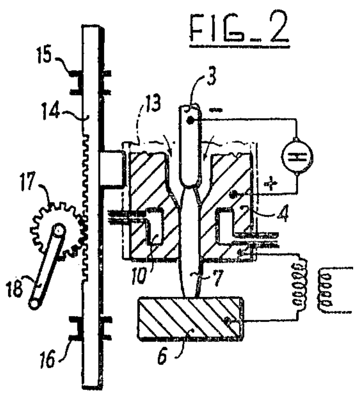
FIGURE 2 shows in diagrammatic axial section equipment making it possible to vary at will the distance between the various electrodes of the alternating current circuit of FIGURE 1.

The group consisting of electrodes 3 and 4 may for this purpose be moved away from the electrode 6 after the plasma has been formed, as shown in FIGURE 2.

The group consisting of electrodes 3 and 4 are mounted on a holder illustrated by frame 13 which is shown for clear identification by dot-and-dash lines. This holder is integral with a rack 14 guided by suitable guides 15 and 16 and operatively engaged by pinion 17 which can assume different angular positions under the action of crank 18. It will of course be evident that the frame 13 must provide insulation between the electrodes. The device of FIGURE 2 or any equivalent one is also applicable to various other embodiments of the invention described below.

Figure 3:
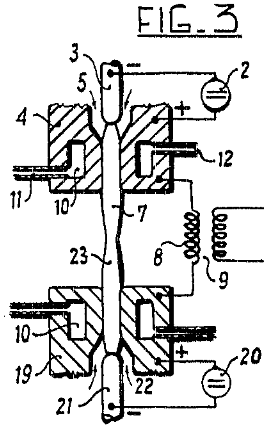
FIGURES 3 to 5 are diagrammatic axial sections of other embodiments of the invention, employing single phase alternating current to power the arc which is used to heat a permanent plasma.

In the device shown in FIGURE 3, the third electrode previously mentioned is also a hollow electrode. This third hollow electrode 19 is connected to one side of a direct current source 20 and the other side of this source is connected to a solid fourth electrode 21 which is in line with the other electrodes. A gas jet 22 projects the plasma 23 formed in the continuous arc sustained between the electrodes 19 and 21 through the hollow electrode 19 to meet the plasma 7. The junction of these two ionized plasmas also insures instantaneous restriking of the alternating arc powered by the source of A.C. voltage 8, 9.

Figure 4:
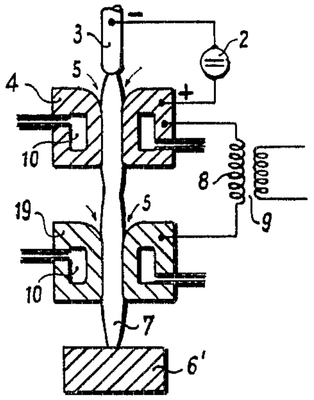

In the device of FIGURE 4, the third electrode 19 is not connected to a source of direct current as it is in FIGURE 3. The third electrode 19 in FIGURE 4 is coaxial with the hollow electrode 4 and the plasma heated by the alternating current arc powered by current source 8, 9, is projected through said third electrode 19 toward the working zone, for example a work piece 6′ to be cut. In this instance the work piece 6′ had no connection whatever with the electrical circuit.

Figure 5:
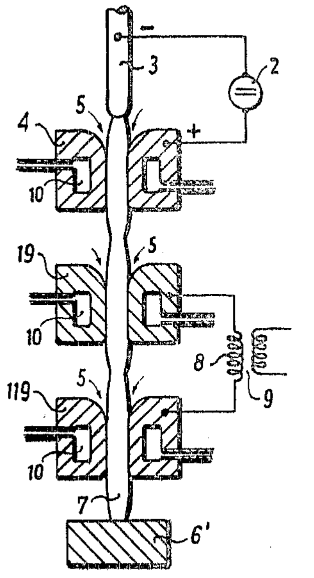

In the equipment of FIGURE 5, the plasma jet formed in the arc between electrodes 3 and 4 is projected sufficiently far to reach, after passing through hollow electrode 4, a fourth and hollow electrode 119 distinct from electrodes 3 and 4 and connected to one side of the alternating current source 8, 9, the other side of which is connected to electrode 19. There is thus no common material junction (electrode) between the direct current circuit and the alternating current circuit in FIGURE 5. The propulsion of the plasma beyond electrode 119 is assisted by an additional gas jet 5 at the inlet of electrode 19 and another gas jet 5 at the inlet of electrode 119.

Figure 6:
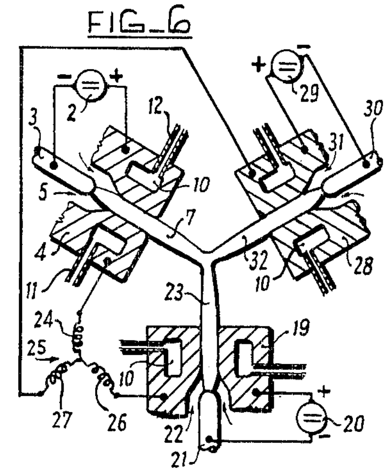
FIGURES 6 and 7 are diagrammatic axial sections showing equipment in which the heating of the plasma is obtained from a three-phase alternating current source.

In the form of the device of the invention shown in FIGURE 6, a hollow electrode 4 is connected to the phase 24 of a star connected source of three-phase alternating current 25 having a common center connection. The hollow electrode 19 is connected to phase 26, while the hollow electrode 28 is connected to phase 27. The hollow electrodes 19 and 28 are connected to sources of direct current 20 and 29 respectively, the opposite sides of which are connected respectively to solid electrodes 21 and 30 properly aligned. Gas jets 22 and 31 project plasmas 23 and 32 until they meet plasma 7 near the center of the device.

The plasmas join and are projected in a composite plasma transverse to the plane of the paper.

Figure 7:
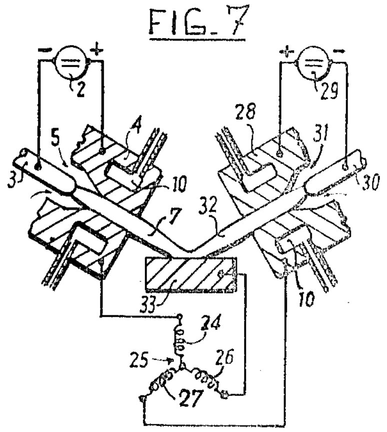

In FIGURE 7, it can be seen that phase 26 of the source of star connected polyphase alternating current is connected to a solid electrode 33 from which no plasma emerges at all. The other hollow electrodes 4 and 28 are connected to phases 24 and 27 respectively and arranged in such a manner that the plasmas 7 and 32 emerging from them meet and contact said solid electrodes 33.

It will be evident that in the case where a source of polyphase current is used to power the electrodes from which arcs emerge, such source will not necessarily be a three-phase source as shown in FIGURES 6 and 7, and it will be necessary simply to adapt the number of electrodes from which arcs are emerging to the number of phases of the source.

Figure 8:
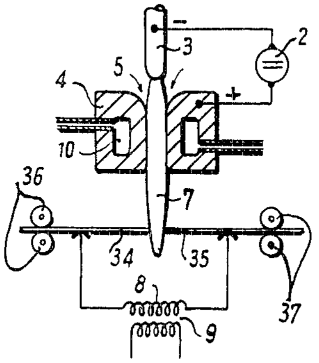
FIGURES 8 and 9 are diagrammatic axial sections showing respectively for a single phase alternating current source and for a three-phase source alternating current, devices in which the alternating current circuit is entirely distinct from the direct current circuit.

In FIGURE 8, the source of alternating current 8, 9 is connected on the one hand to a third electrode which consists of a wire 34, suitably a consumable electrode, and on the other hand is connected to a fourth electrode consisting of a wire 35, suitably a consumable electrode. The electrodes 34 and 35 can move toward one another, for example under the action of feed rolls 36 and 37 and they can act as welding electrodes when an alternating current arc is sustained between them. The ignition of such arc is facilitated by the plasma 7 which joins the tips of the electrodes 34 and 35. In the device of FIGURE 8 as well as in FIGURE 5, none of the elements (electrodes) of the direct current circuit is present in the alternating current circuit which powers the main arc.

Figure 9:
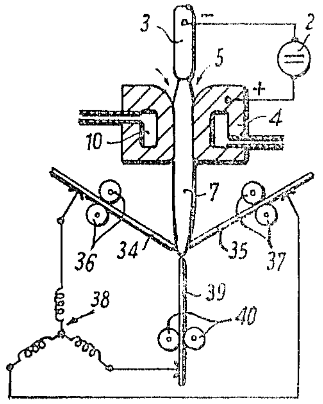

The same thing applies to the device of FIGURE 9 where the wires 34 and 35 are connected each to one of the phases of a three-phase star connected alternating current source 38, which is also connected to a third wire 39 forming another electrode. The wires converge and are fed by feed rolls 36, 37 and 40 respectively. All of the wires 34, 35 and 39 may suitably be consumable electrodes. The ignition of the alternating current arc sustained between these three wires is facilitated by the presence of ionized plasma 7 between their tips.

To simplify the structure of FIGURE 9, it has been assumed that the axis of the hollow electrode 4 and the axes of the wires 34, 35 and 39 lie in a single plane, but in reality it may be advantageous to arrange the three wires along the edges of a pyramid having a triangular base, and to direct the axis of the hollow electrode perpendicularly to said base, passing through the apex of said pyramid.

Instead of using a source of three-phase current, one can of course have a source of polyphase current having any desired number of phases, on condition that the number of wires conforms to the number of phases.

Figure 10:
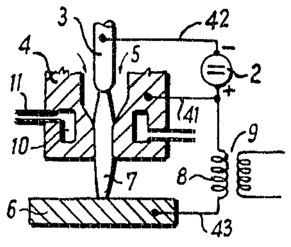
FIGURE 10 shows a diagrammatic axial section of a device which is a variation of FIGURE 1.

The equipment of FIGURE 10 represents a modification of that of FIGURE 1. It differs from FIGURE 1 only in that the source of direct current 2 and the source of alternating current 8, 9, are connected to the common electrode 4 by a common lead 41. The lead joining the source 2 to the solid electrode 3 has been designated by 42 and the lead joining the secondary winding 8 of the transformer to the electrode 6 has been designated 43.

To prevent a fraction of the direct current from deviating into the alternating current circuit 8, 41, 4, 7, 6 and 43, with the effect of causing a loss in the efficiency of the transformer 8, 9 due to magnetic saturation caused by passage of direct current through the transformer coils, it is possible to provide on one of the legs of the transformer in well known manner, a winding through which a direct compensating current will pass, creating a magnetic flux opposite to that of the direct current causing the saturation of the magnetic circuit. Furthermore, the compensating current can be controlled by the circulating current by well known devices. Any other well known means having a similar effect can be employed.

The converse situation should also be considered. In other words, it is undesirable to have a portion of the alternating current flow through the direct current circuit and one or more choke coils are inserted in the direct current circuit to prevent this.

Figure 11:
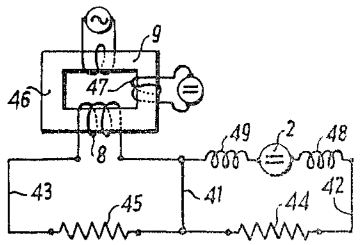
FIGURE 11 is an electric circuit diagram showing how circulation of direct current in the alternating current circuit and of alternating current in the direct current circuit can be prevented in the equipment of FIGURE 10.

FIGURE 11 illustrates an arrangement to deal with these problems. Leads 41 and 43 are in the alternating current circuit and leads 41 and 42 are in the direct current circuit.

Resistor 44 in the direct current circuit illustrates in the electrical diagram of FIGURE 11 the resistance of the gap separating the solid electrode 37 and hollow electrode 4 in FIGURE 10. Resistor 45 in the alternating current circuit illustrates in the electrical diagram of FIGURE 11 the resistance of the gap separating the hollow electrode 4 and the electrode 6 in FIGURE 10.

The core 46 of transformer 9 in FIGURE 11 has a winding 47 through which a direct current circulates from the D.C. source 47′ and this current compensates for possible saturation of the core by the effect of D.C. current migrating through the transformer as shown by the primary winding connected to the suitable A.C. source $47^2$.

In the direct current circuit on the other hand, consisting of elements 2, 42, 44 and 41, choke coils 48 and 49 have been inserted on both sides of the D.C. source 2 to prevent circulation of alternating current through the D.C. circuit.

Figure 12:
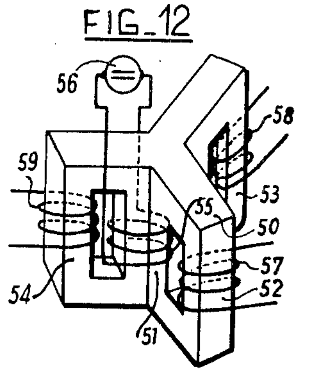
FIGURE 12 is a perspective with added electric circuit diagrams showing a variation of a portion of the device of FIGURE 11.

In case the alternating current would be three-phase current, one or more direct current windings intended to neutralize the auxiliary direct current which might have deviated into the alternating current circuit will be provided in well known manner. For example, these direct current windings may be arranged in the manner shown in FIGURE 12 which shows a well known three-phase transformer 50. The transformer has a central core 51 and three side cores 52, 53 and 54. A winding 55 around the central core 51 receives direct current from a D.C. source 56. This winding is used to compensate for direct circulating currents which might deviate into the three-phase windings 57, 58 and 59 which are star-connected and are wound on the side cores 52, 53 and 54 respectively.

In FIGURES 1 to 10, the hollow electrodes are cooled by a fluid in liquid form which after circulating through the cooling chamber 10, empties from a side outlet 12 shown in FIGURE 1 particularly. The heat carried by the fluid can be partially recuperated to benefit the plasma emerging from the hollow electrodes, by directing the cooling fluid going out of said chamber 10 toward the plasma jet.

Figure 13:
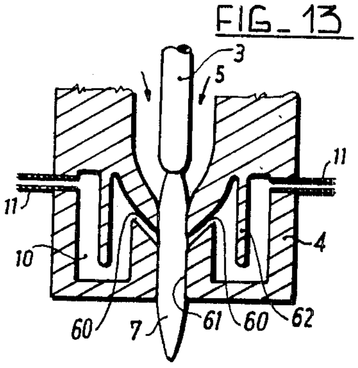
FIGURES 13 and 14 are diagrammatic axial sections showing two variations of the construction of the hollow electrode used in the device of FIGURES 1 to 10.

In FIGURE 13 the heated fluid discharges from the chamber 10 through annular channel 60 set at a sharp angle to the axis of the outlet 61, with its apex down stream, in order to aid the motion of the plasma jet. It can also be seen in FIGURE 13 that the cooling chamber 10 is provided with an internal annular baffle 62 preventing direct passage of the cooling fluid from the inlet 11 to the outlet 60.

Figure 14:
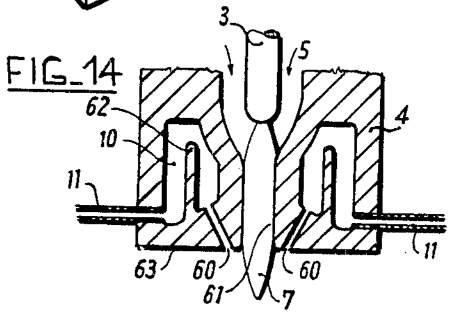

In FIGURE 14 the annular outlet channel 60 reaches the front face 63 of the hollow electrode 4 instead of joining the central outlet 61. The jet of fluid emerging from the annular outlet 60 is directed forward convergingly toward the axis of the jet stream and assists the motion of the plasma jet 7.

While returning to the plasma jet a portion of the heat energy which the plasma transferred to the hollow electrode, the heated fluid may suitably act by its physical, chemical or other properties, during its passage through the hollow electrode, in some process of manufacture or transformation involving one or more steps, for instance the cracking of mineral oils or the synthesis of acetylene.

The choice between the two forms shown in FIGURES 13 and 14 depends upon the nature of the cooling fluid. If the vapors of the cooling fluid ionize with difficulty and therefore may tend to extinguish the arc, it is preferable to use the device of FIGURE 14.

Figure 15:
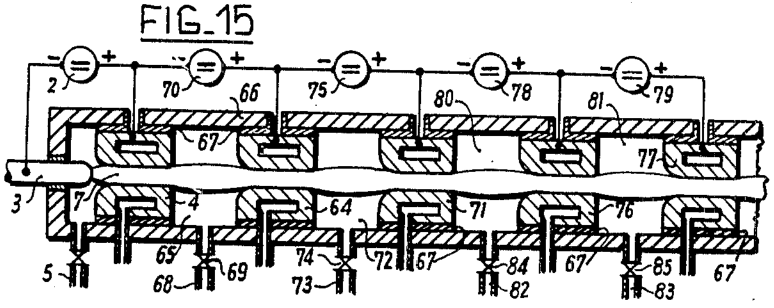
FIGURE 15 is a diagrammatic axial section of equipment for heating by direct current a plasma which is projected through successive hollow electrodes.

In the equipment of FIGURE 15, the plasma jet 7 emerges from the first hollow electrode 4 and is projected beyond a second hollow electrode 64 arranged along the axis of the first one and separated from it by a chamber 65 surrounded by a spaced cylindrical wall 66. Both hollow electrodes 4 and 64 are insulated electrically from each other by sleeves 67 of insulating materials inserted between the cylindrical wall 66 at each end and the respective hollow electrodes. The chamber 65 is provided with an inlet 68 equipped with a control valve 69 which permits an adjustment of the input of a fluid sent under pressure into the chamber 65.

An arc is maintained between the hollow electrodes 4 and 64 by connecting them to a D.C. source 70. The pair of hollow electrodes 4 and 64 are followed by another hollow electrode 71 in line with the common axis and forming with the preceding electrode 64 a new pair of hollow electrodes 64, 71. The hollow electrodes 64 and 71 are insulated electrically from each other by means of insulating sleeves 67 inserted between them and the cylindrical wall 66. The cylindrical wall 66 encloses a chamber 72 which is provided with an inlet 73 controlled by a valve 74 similar to the inlet 68 controlled by the valve 69 for admitting fluid to propel the plasma jet. The electrodes 64 and 71 are connected to a source 75 of direct current distinct from the source 70. The source 75 is capable of sustaining between the electrodes 64 and 71 an arc which further heats the plasma jet entering the chamber 72. This new plasma jet is expelled beyond the hollow electrode 71 by fluid under pressure admitted by inlet 73.

In FIGURE 15 the first two pairs of hollow electrodes 4, 64 and 64, 71 are followed by other pairs of hollow electrodes which may be as numerous as desired. Thus hollow electrode 76 and hollow electrode 77 are also in line with the common axis. They are insulated from one another by electrically insulating sleeves 67. A source of direct current 78 maintains an arc between hollow electrodes 71 and 76 and a source of direct current 79 maintains an arc between hollow electrodes 76 and 77. Chamber 80 is provided between hollow electrodes 71 and 76 and chamber 81 is provided between hollow electrodes 76 and 77. Chamber 80 is provided with inlet 82 controlled by valve 84 and chamber 81 is provided with inlet 83 controlled by valve 85, in each case to introduce fluid under pressure.

The fluid introduced into the successive chambers may be of different characters. The inputs of fluid in the respective chambers may be adjusted by valves 69, 74, 84 and 85. The inlets may be used to introduce, under a continuous or in an intermittent manner, one material or a mixture of materials in powder or liquid form. Materials can also be brought into the successive closed chambers by other means, for example by introducing wires which will suitably be consumable. The delivery of these materials can be controlled by control of the power developed in the successive arcs.

It is obvious that the initial arc may be created by known means other than the ones shown in FIGURE 15.

Figure 16:
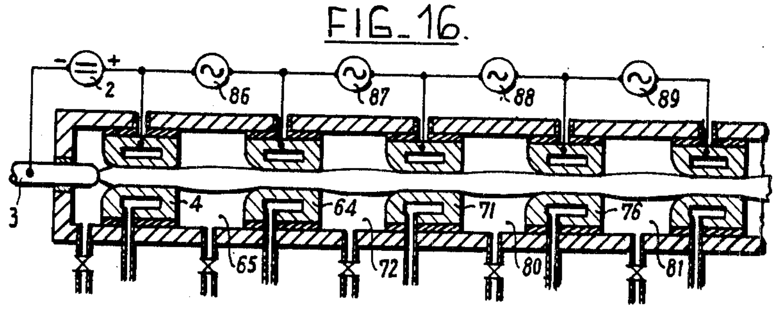
FIGURES 16 and 17 show in diagrammatic axial sections other embodiments of the equipment for heating, by means of dephased alternating current, a plasma which is projected through successive hollow electrodes.

An advantageous way of powering the successive arcs is shown in FIGURE 16. In this form, the heating of the plasma jet created between the electrodes 3 and 5 by a source of direct current 2 and sent beyond the hollow electrode 64 is obtained, as in FIGURES 1 to 10, by a source of alternating current 86 between electrodes 4 and 64. The other arcs are respectively powered by alternating current from successive sources 87, 88 and 89 which are dephased one with respect to another and to the electrode 64 to such an extent that, when the current wave of one of these sources passes through zero in one chamber, for example, the wave from current source 87 in chamber 72, then the current wave from the preceding source 86 in the preceding chamber 65 has a value sufficient to create an arc whose plasma when expelled in the chamber 72 will restrike the arc instantaneously in the chamber 72 after the current supplied by the source 87 has passed zero.

In the equipment shown in FIGURE 16, the plasma created between the electrodes 3 and 4 is permanently sustained in chamber 65 and therefore permits instantaneous restriking of the alternating arc powered by the current source 86. By virtue of the dephasing between the current sources 86 and 87, at the time the alternating current passes zero, there is in chamber 72 a plasma permitting instantaneous restriking of the arc powered by the current source at 87. Instantaneous restriking of the successive arcs powered by alternating current is therefore insured in all chambers of the equipment.

Figure 17:
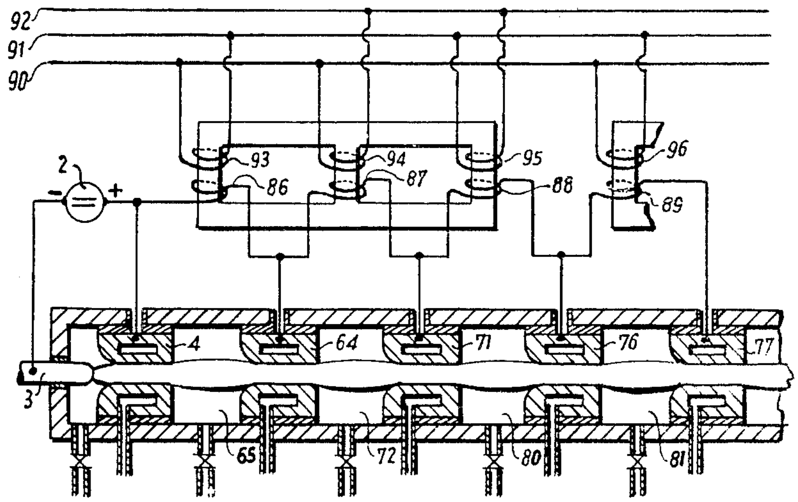

FIGURE 17 shows a convenient embodiment employing desirably dephasing between the sources of current where a polyphase source is available. Thus a three-phase power source receiving alternating current through wires 90, 91 and 92 is shown and the respective phases are connected to primary transformer windings 93, 94 and 95 of one group and then to primary windings of the next transformer, only one of which is shown at 96, and so on.

The transformer secondary windings 86 to 89 are connected to the respective hollow electrodes 4, 64, 71, 76 and 77 which are arranged as previously discussed in FIGURES 15 and 16.

Figure 18:
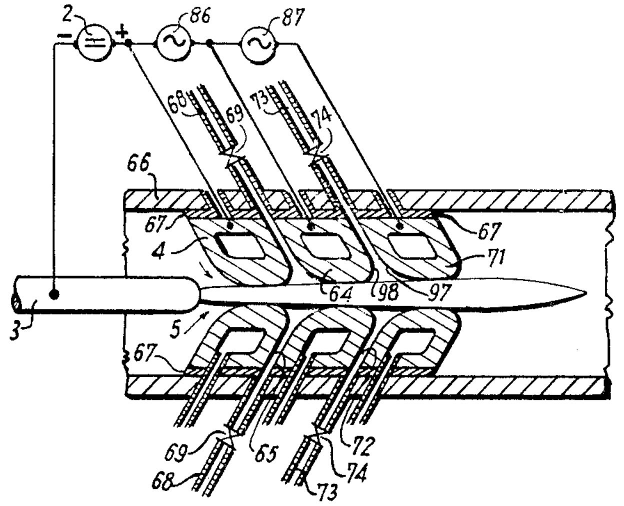
FIGURE 18 is a diagrammatic central longitudinal section of a portion of FIGURE 16, showing a variation.

In FIGURE 18 equipment is shown which brings the hollow electrodes closer to one another than they are in the forms of FIGURES 15 to 17. The closer setting of these electrodes is of advantage when the duration of the reactions occurring in the chambers separating the electrodes must be reduced. However, it is better to allow a minimum distance of two millimeters between any two successive hollow electrodes.

In order to avoid lateral expansion of the plasma between the successive hollow electrodes, which may be caused by electromagnetic effects or by hydrodynamic effects which are antagonistic and are due to either moving the plasma from a given cross section to a smaller one, or are caused by insufficient distance between the hollow electrodes, it is desirable to design the hollow electrodes with central output channels increasing in width, or cross section as the plasma moves forward. Thus in FIGURE 18 the central channel of electrode 71 is larger than the central channel of electrode 64 and the central channel of electrode 64 is wider than that of electrode 4. In fact, in the form shown, the central channels are conical and larger toward the outlet.

In order to facilitate the advance of the plasma, it is advantageous to design hollow electrodes which nest into each other in the manner shown in FIGURE 18. The back face 97 of each electrode is shaped as a truncated cavity while the front face of each electrode is shaped as a truncated projection into the truncated cavity facing it.

The inlets 68 and 73 for the admission of fluid into the truncated gaps which form the chambers 65 and 72 are preferably inclined to the angle of the said truncated surfaces as shown.

It will be evident that the invention is not exclusively limited to the forms of execution illustrated, and that many modifications can be made in the form and arrangement of the elements used in the execution of the device, providing that these changes are consistent with the objects set forth in the following claims.

In view of my invention and disclosure variations and modifications to meet individual whim or particular need will doubtless become evident to others skilled in the art, to obtain all or part of the benefits of my invention without copying the equipment shown, and I therefore claim all such insofar as they fall within the reasonable spirit and scope of my claims.

Having thus described my invention, what I claim as new and desire to secure by letters Patent is:

1. In an equipment for creating a high temperature plasma by means of an electric arc powered by alternating current, at least three electrodes including a first electrode, a second electrode having a central channel coaxial with said first electrode and having a position forward of said first electrode in the direction in which plasma is to flow, a third electrode having a central channel coaxial with said second electrode and having a position forward of said second electrode in the direction in which plasma is to flow, a source of direct current for an arc to be sustained from said first electrode through the channels of said second and third electrodes and having one pole connected to said first electrode and the other pole connected to said second electrode, and a source of alternating current to operate the arc connected to said second electrode and to said third electrode, said second and third electrodes having opposed annular faces inclined toward the axis of said electrodes in the direction in which plasma is to flow, said opposed annular faces forming a gap for fluid to be received in the gap and be output to project plasma in the direction in which plasma is to flow.

2. Equipment of claim 1 in which a rearward face of said third electrode is in a hollow truncated cavity in the direction in which plasma is to flow and a forward face of said second electrode is on a projection in the direction in which plasma is to flow, said rearward and forward faces being complementary and paired forming a gap for fluid to be received in the gap and be output to project plasma in the direction in which plasma is to flow.

3. Equipment of claim 1, in which said central channel of said third electrode has a passage area larger than the passage area of the central channel of said second electrode.

4. Equipment of claim 1, in which each one of said second and third electrodes includes a chamber and a pair of said annular faces having said gap between the pair communicating with said chamber for cooling fluid to be output and project plasma in the direction in which plasma is to flow.

5. Equipment of claim 4, in which said gap in each of said second and third electrodes directs heated cooling fluid into the central channel of the corresponding hollow electrode.

6. Equipment of claim 4, in which said second and third electrodes have end faces forward in the direction in which plasma is to flow and said gap in each of said second and third electrodes has exit through said forward end face of the corresponding electrode.

7. Equipment of claim 4, in which the cooling chambers of said second and third electrodes have internal baffles preventing direct passage of the cooling fluid to said gaps.

8. In an equipment for creating a high temperature plasma by means of an electric arc powered by alternating current, at least four electrodes including a first electrode, and second, third and fourth electrodes each having a central channel coaxial with said first electrode and sequentially having positions more forward of said first electrode in the direction in which plasma is to flow, a source of direct current for an arc to be sustained from said first electrode through the channels of said second, third and fourth electrodes and having one pole connected to said first electrode and the other pole connected to said second electrode, a source of alternating current to operate the arc connected to said second electrode and to said third electrode, and a source of alternating current to operate the arc connected to said third electrode and to said fourth electrode, said second, third and fourth electrodes having pairs of annular faces on adjacent ends thereof inclined toward the axis of said electrodes in the direction in which plasma is to flow and said annular faces in each pair forming a gap for fluid to be received in the gap and be output to project plasma in the direction in which plasma is to flow.

9. Equipment of claim 8, in which the areas of the central channels of said second, third and fourth electrodes respectively are larger from one electrode to the next for the arc to pass through said channels.

References Cited by the Examiner

UNITED STATES PATENTS

| | | | |
|---|---|---|---|
| 2,508,954 | 5/50 | Latour et al. | 313—231 |
| 2,945,119 | 7/60 | Blackman. | |
| 3,071,678 | 1/63 | Neely et al. | 219—76 |
| 3,146,371 | 8/64 | McGinn | 219—75 X |
| 3,147,329 | 9/64 | Gage | 219—121 X |
| 3,149,222 | 9/64 | Giannini et al. | 219—121 |

ANTHONY BARTIS, *Acting Primary Examiner.*

JOSEPH V. TRUHE, Sr., *Examiner.*